(12) United States Patent
Nagao et al.

(10) Patent No.: US 8,061,235 B2
(45) Date of Patent: Nov. 22, 2011

(54) HANDLEBAR ASSEMBLIES AND VEHICLES INCLUDING SAME

(75) Inventors: Daisuke Nagao, Long Beach, CA (US); Kenji Tamura, Redondo Beach, CA (US)

(73) Assignee: Honda Motor Company, Ltd., Tokyo (JP)

( * ) Notice: Subject to any disclaimer, the term of this patent is extended or adjusted under 35 U.S.C. 154(b) by 180 days.

(21) Appl. No.: 12/254,865

(22) Filed: Oct. 21, 2008

(65) Prior Publication Data
US 2010/0096828 A1    Apr. 22, 2010

(51) Int. Cl.
*B62K 21/16* (2006.01)
(52) U.S. Cl. ..................................... 74/551.3
(58) Field of Classification Search ............... 74/551.1, 74/551.3, 551.5; 280/270, 288.4, 304.3; 16/421; 180/22
See application file for complete search history.

(56) References Cited

U.S. PATENT DOCUMENTS

| | | |
|---|---|---|
| 1,164,122 A | 12/1915 | St. Yves |
| 1,756,339 A | 4/1930 | Broberg |
| 3,505,901 A | 4/1970 | Stone |
| 4,023,436 A | 5/1977 | Dodge |
| 4,361,057 A | 11/1982 | Kochera |
| 4,384,497 A | 5/1983 | Gatsos |
| 4,420,989 A | 12/1983 | Finkle |
| 4,540,189 A | 9/1985 | Tanaka |
| 4,624,470 A | 11/1986 | Love |
| 4,682,509 A | 7/1987 | Takamiya et al. |
| 4,729,255 A | 3/1988 | Moulton |
| 5,078,391 A | 1/1992 | Moore, Sr. |
| 5,458,213 A | 10/1995 | Nakaya et al. |
| 5,685,201 A | 11/1997 | Renshaw |
| 5,727,427 A | 3/1998 | Nien |
| 6,234,042 B1 | 5/2001 | An |
| 6,467,787 B1 | 10/2002 | Marsh |
| 6,578,652 B1 | 6/2003 | Kobacker, II et al. |
| 6,860,500 B2 | 3/2005 | Hissam |
| 6,945,136 B2 | 9/2005 | Nielsen |
| 6,973,853 B2 | 12/2005 | Chang |
| 7,343,831 B1 | 3/2008 | Tamcsin |
| 7,685,904 B2 | 3/2010 | Cutsforth |
| 7,798,511 B2 | 9/2010 | Takenaka |
| 2003/0141121 A1 | 7/2003 | Flowers et al. |
| 2005/0109151 A1 | 5/2005 | Chiang et al. |
| 2005/0206120 A1 | 9/2005 | Liao |
| 2006/0162483 A1 | 7/2006 | Bowers |

FOREIGN PATENT DOCUMENTS

| | | |
|---|---|---|
| DE | 4336485 A1 * | 6/1994 |
| EP | 53667 A1 * | 6/1982 |

OTHER PUBLICATIONS

U.S. Appl. No. 12/612,808, Titled: Adjustable Handlebar Assembly for a Saddle-Type Vehicle, filed Nov. 5, 2009, Inventors: Darin D. King, et al., it its entirely.

* cited by examiner

*Primary Examiner* — Vicky Johnson
(74) *Attorney, Agent, or Firm* — Ulmer & Berne LLP

(57) ABSTRACT

A handlebar assembly is provided for a vehicle such as a motorcycle. The handlebar assembly includes a base, a left arm, a left handle, a right arm, and a right handle. The left and right arms are attached to the base and are rotatable with respect to the base about respective left and right arm axes. The left and right handles are respectively attached to the left and right arms and are respectively rotatable with respect to the left and right arms about left and right handle axes. Vehicles including the handlebar assembly are also disclosed.

17 Claims, 2 Drawing Sheets

HANDLEBAR ASSEMBLIES AND VEHICLES INCLUDING SAME

TECHNICAL FIELD

A handlebar assembly is provided for a vehicle. In particular, the handlebar assembly can have left and right arms which are selectively rotatable about one or more axes with respect to a base. Left and night handles can be respectively attached to the left and right arms such that they are selectively rotatable with respect to the left and right arms about one or more other axes.

BACKGROUND

Conventional motorcycles often include a handlebar assembly having left and right handles. Control actuators can be attached to one or both of the left and right handles to facilitate an operator's control of features of the motorcycle. In some circumstances, the left and right handles can be pivotally adjusted such as to accommodate different positions of an operator of the motorcycle. However, in many of the available pivotal positions of such left and right handles, an operator may not be able to reach and/or comfortably manipulate the control actuators attached to the left and right handles.

SUMMARY

In accordance with one embodiment, a motorcycle comprises a handlebar assembly. The handlebar assembly comprises a base, a left arm, a right arm, a left handle, and a right handle. The base is attached to the fork and has a left attachment portion and a right attachment portion. The left arm is attached to the left attachment portion of the base and is selectively rotatable with respect to the base about a left arm axis. The right arm is attached to the right attachment portion of the base and is selectively rotatable with respect to the base about a right arm axis. The left handle is attached to the left arm and extends longitudinally along a left handle axis. The left handle is selectively rotatable with respect to the left arm about the left handle axis. The right handle is attached to the right arm and extends longitudinally along a right handle axis. The right handle is selectively rotatable with respect to the right arm about the right handle axis.

In accordance with another embodiment, a vehicle comprises a handlebar assembly. The handlebar assembly comprises a base, a left arm, a right arm, a left handle, and a right handle. The base is configured for rotatable attachment to a frame of the vehicle. The base has a left attachment portion and a right attachment portion. The left arm is attached to the left attachment portion of the base and is selectively rotatable with respect to the base about a left arm axis. The right arm is attached to the right attachment portion of the base and is selectively rotatable with respect to the base about a right arm axis. The left handle is attached to the left arm and extends longitudinally along a left handle axis. The left handle is selectively rotatable with respect to the left arm about the left handle axis. The right handle is attached to the right arm and extends longitudinally along a right handle axis. The right handle is selectively rotatable with respect to the right arm about the right handle axis.

In accordance with yet another embodiment, a handlebar assembly is provided for a vehicle. The handlebar assembly comprises a base, a left arm, a right arm, a left handle, and a right handle. The base has a left attachment portion and a right attachment portion. The base is configured for rotatable attachment to a frame of the vehicle. The left arm is attached to the left attachment portion of the base and is selectively rotatable with respect to the base about a left arm axis. The right arm is attached to the right attachment portion of the base and is selectively rotatable with respect to the base about a right arm axis. The left handle is attached to the left arm and extends longitudinally along a left handle axis. The left handle is selectively rotatable with respect to the left arm about the left handle axis. The right handle is attached to the right arm and extends longitudinally along a right handle axis. The right handle is selectively rotatable with respect to the right arm about the right handle axis.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION

Embodiments are hereinafter described in detail in connection with the views of FIGS. 1-2, wherein like numbers indicate the same or corresponding elements throughout the views. A handlebar assembly can be provided for a vehicle such as, for example, a saddle-type vehicle. A saddle-type vehicle can include, for example, any of a variety of vehicles configured for recreational or utility purposes and that comprises a handlebar assembly to facilitate steering of the vehicle by an operator. For example, saddle-type vehicles can include motorcycles, scooters, bicycles, all terrain vehicles, personal watercraft, and snowmobiles.

Figure 1:
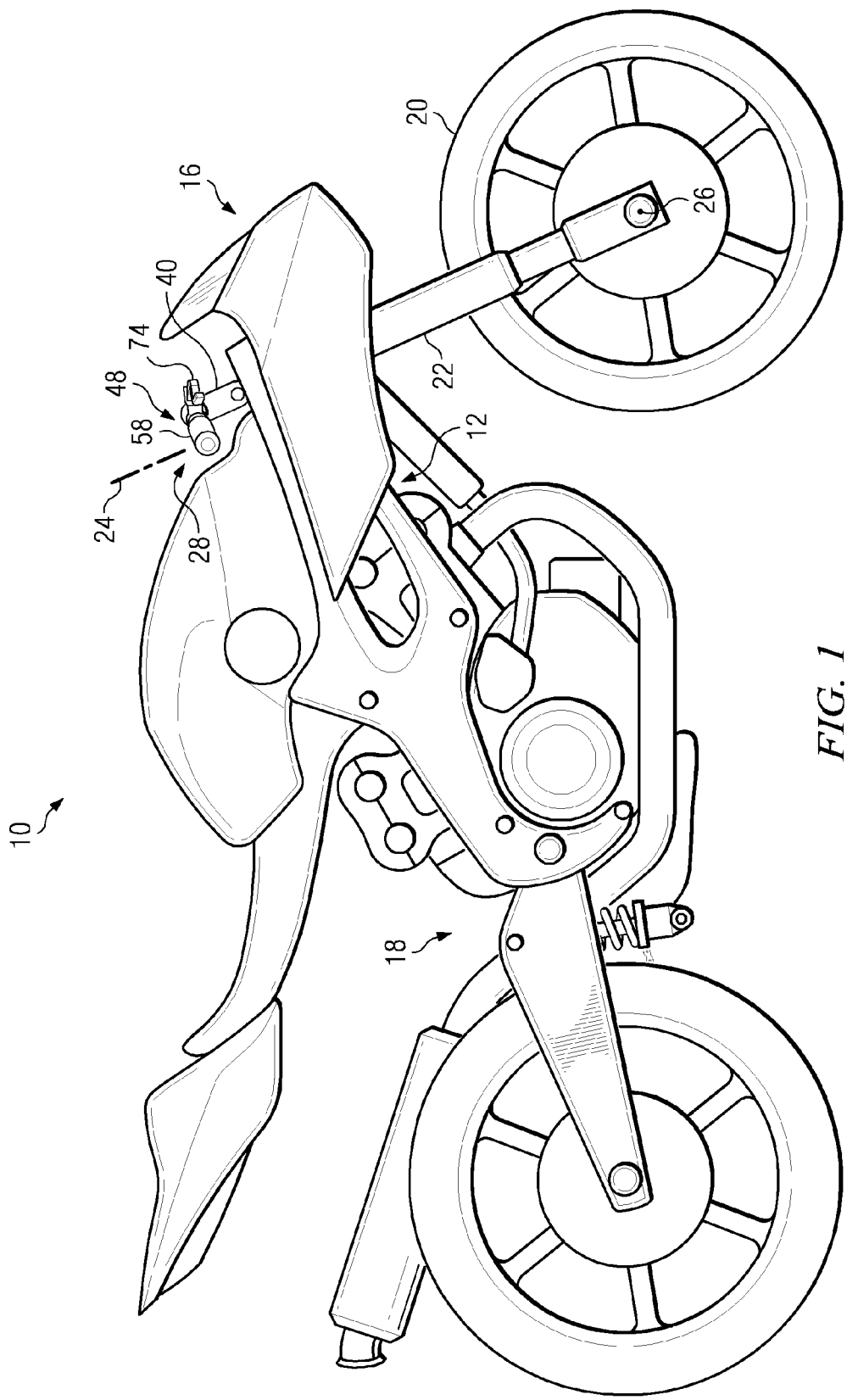
FIG. 1 is a side elevational view depicting a motorcycle having a handlebar assembly in accordance with one embodiment.

In one particular embodiment, as depicted in FIG. 1, a motorcycle 10 is shown to include a frame 12, a front wheel 20, and a fork 22. The frame 12 is shown to extend along a longitudinal axis from a forward end 16 to a rearward end 18. The fork 22 may be rotatably attached to the frame 12 adjacent to the forward end 16 of the frame 12 such that the fork 22 is rotatable with respect to the frame 12 about a steering axis 24. The front wheel 20 of the motorcycle may be attached to the fork 22 such that the front wheel 20 is rotatable with respect to the fork 22 about a wheel axis 26. A steering axis may or may not be coplanar with a wheel axis of a front wheel of a vehicle.

The motorcycle 10 is also shown to include a handlebar assembly 28 which can be rotatably attached to the frame 12 to facilitate steering of the fork 22 about the steering axis 24, and resultant steering of the motorcycle 10, by an operator of the motorcycle 10. In one embodiment, as shown in FIGS. 1-2, the handlebar assembly 28 can comprise a base 30, a left arm 36, a right arm 40, a left handle 44, and a right handle 48. It will be appreciated that the various components of the handlebar assembly 28 can be formed from metal, plastic, carbon fiber, composites, and/or any of a variety of other materials. The base 30 can be rotatably attached with respect to the frame 12 of the motorcycle 10 and can also be attached to the fork 22. In particular, the base 30 is shown in FIG. 2 to include a mounting interface 35 which can be configured to facilitate rotatable attachment of the base 30 to the frame 12 at a location adjacent to the forward end 16 of the frame 12. In this embodiment, the base 30 can be configured to secure the entire handlebar assembly 28 to both the frame 12 and the fork 22. It will be appreciated that the mounting interface 35 can facilitate attachment of the base 30 to the frame 12 through use of fasteners, bearings, bushings, and/or other components or arrangements.

Figure 2:
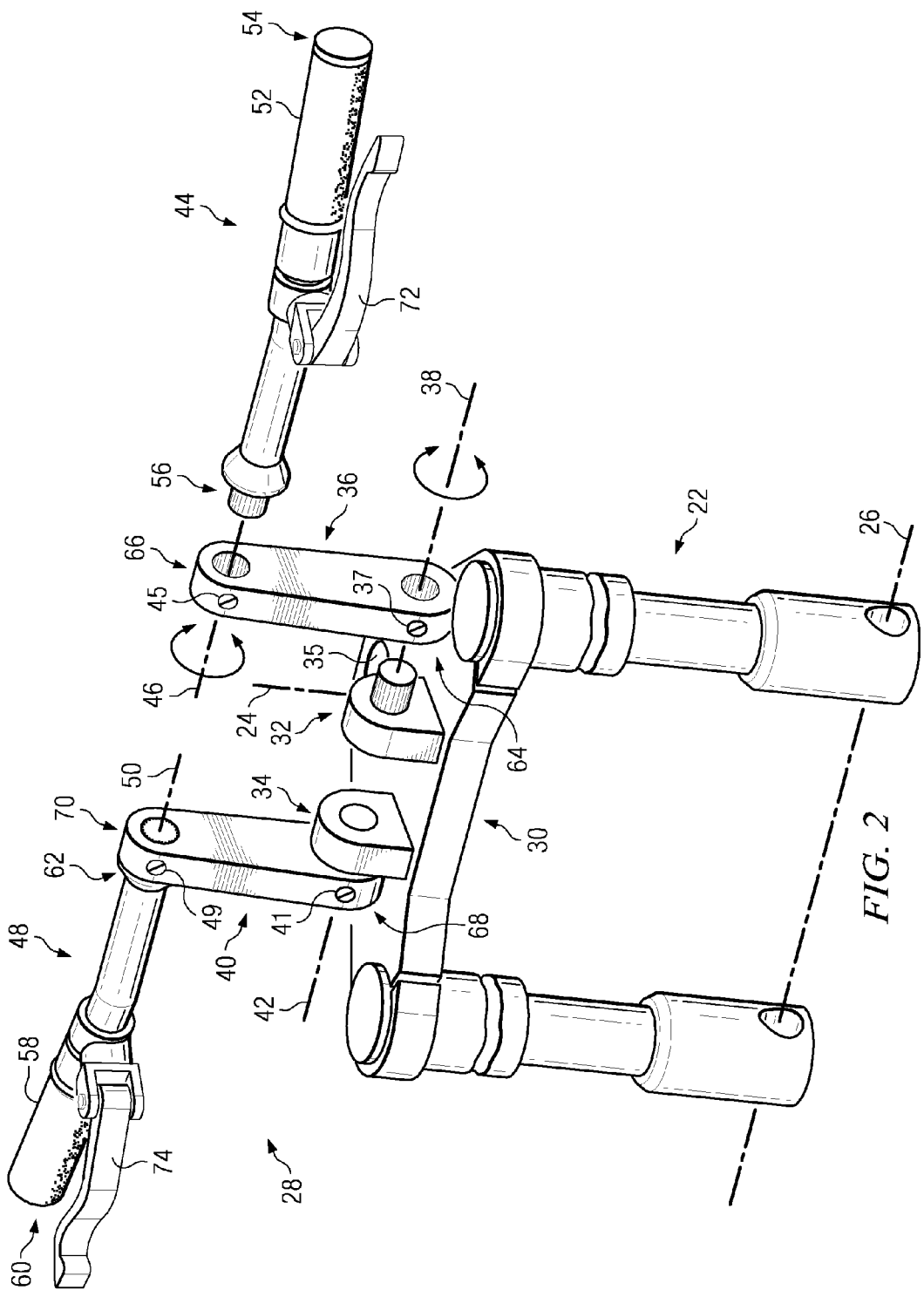
FIG. 2 is a partially disassembled front perspective view depicting certain of the components of the motorcycle of FIG. 1.

Referring still to the example of FIGS. 1-2, the base 30 is shown to include a left attachment portion 32 and a right attachment portion 34. The left and right attachment portions 32, 34 can be provided upon opposite sides of the base 30, as shown in FIG. 2. It is contemplated, however, that the left and right attachment portions might otherwise be provided by a base in any of a variety of alternative configurations.

The left arm 36 of the handlebar assembly 28 is shown to comprise a lower left end 64 and an upper left end 66, and to extend from the lower left end 64 to the upper left end 66. Likewise, the right arm 40 of the handlebar assembly 28 is shown to comprise a lower right end 68 and an upper right end 70, and to extend from the lower right end 68 to the upper right end 70. The left arm 36 is shown to be attached to the left attachment portion 32 of the base 30 adjacent to the lower left end 64, while the right arm 40 is shown to be attached to the right attachment portion 34 of the base 30 adjacent to the lower right end 68.

In one embodiment, the left arm 36 may be selectively rotatable by an operator of the motorcycle 10 about a left arm axis 38 with respect to the left attachment portion 32 of the base 30. Similarly, the right arm 40 may be selectively rotatable by an operator of the motorcycle 10 about a right arm axis 42 with respect to the right attachment portion 34 of the base 30. In one embodiment, as shown with respect to the motorcycle 10 of FIGS. 1-2, the left and right arm axes 38, 42 can be generally parallel with the wheel axis 26 of the front wheel 20 of the motorcycle 10. In another embodiment, as also shown with respect to the motorcycle 10 of FIGS. 1-2, the left and right arm axes 38, 42 can be perpendicular to the longitudinal axis of the motorcycle 10. In yet another embodiment, as also shown with respect to the motorcycle 10 of FIGS. 1-2, the left and right arm axes 38, 42 can be substantially aligned with one another. However, in alternative embodiments, it will be appreciated that a handlebar assembly might be configured such that the left and right arm axes are otherwise oriented.

The left arm 36 and the left attachment portion 32 of the base 30 are shown in FIG. 2 to comprise interlocking splines which facilitate attachment of the left arm 36 to the left attachment portion 32 of the base 30. One or more bolts or other fasteners (e.g., set screw 37 in FIG. 2) might be used to facilitate securement of this connection when the splines are fully interlocked in a desired position. Likewise, the right arm 40 and the right attachment portion 34 of the base 30 can similarly comprise interlocking splines which facilitate attachment of the right arm 40 to the right attachment portion 34 of the base 30. One or more bolts or other fasteners (e.g., set screw 41 in FIG. 2) might be used to facilitate securement of this connection when the splines are fully interlocked in a desired position (as shown in FIG. 2 with respect to the attachment of the right arm 40 to the right attachment portion 34 of the base 30). It will be appreciated that any of a variety of other types of splined or otherwise selectively mechanically interlocking relationships can additionally or alternatively be provided to facilitate attachment and selective rotation of left and right arms with respect to left and right attachment portions of a base 30.

In one embodiment, if an operator desires to adjust the distance of a handle (e.g., 44 or 48) from himself or herself, the operator might first remove any bolts or other fasteners (e.g., set screws 37, 41) which are securing an associated arm (e.g., 36, 40) to the base 30. The operator can then disengage any splined connection between the arm and the base 30 (e.g., by pulling the arm away from the base 30). The operator can then rotate the arm with respect to the base 30, reengage any splined connection (e.g., by pushing the arm onto or into the base 30), and reinsert the bolts or other fasteners. Readjustments can then be made by repeating this process. Accordingly, the left and right arms 36, 40 may be selectively rotatable about respective left and right arm axes 38, 42 such that the left and right arms 36, 40 may rotate toward or away from the operator of the motorcycle 10. For example, by rotating the left and right arms 36, 40 about the respective left and right arm axes 38, 42, it will be appreciated that the distance between each of the left and right handles 44, 48 with respect to the operator of the motorcycle 10 can be increased or decreased. It will also be appreciated that each of the left and right arms 36, 40 can be secured in any of a variety of desired positions to facilitate comfortable operation of the motorcycle 10 by an operator.

The left and right handles 44, 48 may be respectively attached to the left and right arms 36, 40 of the handlebar assembly 28. For example, as shown in FIG. 2, the left handle 44 can extend along a left handle axis 46 from an inner left end 56 and toward an outer left end 54. The left handle 44 can be attached to the left arm 36 adjacent to the inner left end 56 of the left handle 44. More particularly, the inner left end 56 of the left handle 44 may be attached to the left arm 36 adjacent to the upper left end 66 of the left arm 36. The left handle 44 is shown to comprise a left handgrip 52 which can be positioned adjacent to the outer left end 54 of the left handle 44. An operator of the motorcycle 10 can selectively use his or her left hand to grasp the left handgrip 52 for steering of the motorcycle 10 and/or for securement of himself or herself upon the motorcycle 10.

Likewise, the right handle 48 is shown in FIG. 2 to extend along a right handle axis 50 from an inner right end 62 and toward an outer right end 60. The right handle 48 can be attached to the right arm 40 adjacent to the inner right end 62 of the right handle 48. More particularly, the inner right end 62 of the right handle 48 may be attached to the right arm 40 adjacent to the upper right end 70 of the right arm 40. The right handle 48 is shown to comprise a right handgrip 58 which can be positioned adjacent to the outer right end 60 of the right handle 48. An operator of the motorcycle 10 can selectively use his or her right hand to grasp the right handgrip 58 for steering of the motorcycle 10 and/or for securement of himself or herself upon the motorcycle 10.

The left and/or right handles 44, 48 can include one or more control actuators to facilitate an operator's control of features of the motorcycle 10. For example, as shown in FIG. 2, the left handle 44 may comprise a left lever 72 provided adjacent to the left handgrip 52. Likewise, the right handle 48 may comprise a right lever 74 provided adjacent to the right handgrip 58. In one embodiment, one of the left and right levers 72, 74 can be configured to control a transmission clutch present upon the motorcycle 10, and the other of the left and right levers 72, 74 can be configured to control a wheel brake present upon the motorcycle 10. In another embodiment, both of the left and right levers 72, 74 can be configured to control respective wheel brakes present upon the motorcycle 10. In yet another embodiment, one or both of the left and right levers 72, 74 can be configured to control other features of the motorcycle 10. It will also be appreciated that the left and right handles 44, 48 may additionally or alternatively comprise other control actuators such as, for example, switches, pushbuttons, dials, lamps, gauges, or other devices to facilitate control and/or monitoring of electrical and/or mechanical devices (e.g., engine, horn, radio, headlamps, running lamps, cargo lamps) present upon the motorcycle 10.

Referring again to FIG. 2, the left handle 44 may be selectively rotatable with respect to the left arm 36 about the left handle axis 46. Likewise, the right handle 48 may be selectively rotatable with respect to the right arm 40 about the right handle axis 50. This rotatability of the left and right handles 44, 48 can be achieved through use of a removable attachment of the left handle 44 to the left arm 36 and of the right handle 48 to the right arm 40. This removable attachment may be achieved in a variety of ways. For example, in accordance with one embodiment, as shown in FIG. 2, the left handle 44 and the left arm 36 can comprise interlocking splines which facilitate attachment of the left handle 44 to the left arm 36. One or more bolts or other fasteners (e.g., set screw 45 in FIG. 2) might be used to facilitate securement of this connection when the splines are fully interlocked in a desired position. Likewise, the right handle 48 and the right arm 40 can comprise interlocking splines which facilitate attachment of the right handle 48 to the right arm 40. One or more bolts or other fasteners (e.g., set screw 49 in FIG. 2) might be used to facilitate securement of this connection when the splines are fully interlocked in a desired position (as shown in FIG. 2 with respect to the attachment of the right handle 48 to the right arm 40). It will be appreciated that any of a variety of other types of splined or otherwise selectively mechanically interlocking relationships can additionally or alternatively be provided to facilitate attachment and selective rotation of left and right handles with respect to left and right arms.

In one embodiment, if an operator desires to adjust the position of a control actuator (e.g., the lever 72) attached to a handle (e.g., the left handle 44) such as to facilitate more comfortable operation of the control actuator by the operator, the operator might first remove any bolts or other fasteners (e.g., set screw 45) which are securing the handle to its associated arm (e.g., the left arm 36). The operator can then disengage any splined connection between the handle and the arm (e.g., by pulling the handle away from the arm), rotate the handle with respect to the arm, reengage any splined connection (e.g., by pushing the handle into or onto the arm), and reinsert the bolts or other fasteners. Readjustments can then be made by repeating this process. Accordingly, in one embodiment, the left and right handles 44, 48 may be selectively rotatable about the respective left and right handle axes 46, 50 into any of a variety of positions such that any control actuators provided upon the left and right handles 44, 48 can be comfortably accessed by an operator of the motorcycle 10.

In one embodiment, the left and right handle axes can be generally parallel with the wheel axis of the front wheel of the motorcycle. In another embodiment, each of the left and right handle axes can be generally parallel with the left and right arm axes, respectively. In yet another embodiment, the left and right handle axes can be perpendicular to the longitudinal axis of the motorcycle. In yet another embodiment, the left and right handle axes can be substantially aligned with one another. However, in alternative embodiments, it will be appreciated that the handlebar assembly might be configured such that the left and right handle axes are otherwise oriented.

Accordingly, it will be appreciated that a handlebar assembly in accordance with one embodiment can be adjustable by an operator to facilitate comfortable operation of a vehicle by the operator. In particular, as indicated above, the handlebar assembly can include left and right arms which can be selectively rotated about respective arm axes so as to adjust the distance of left and right handles from the operator of the vehicle. Each of the left and right handles can then be rotated with respect to the respective left and right arms such that any control actuators (e.g., brake and clutch levers) provided upon the left and right handles can be positioned for comfortable use by the operator of the vehicle. It will therefore be appreciated that a handlebar assembly in accordance with one embodiment can provide a simple, lightweight, inexpensive, and versatile arrangement by which an operator may adjust both the distance between the operator and the handles, as well as the position(s) of control actuators provided upon the handles. It will also be appreciated that an operator might enjoy greater comfort in operating a vehicle having a handlebar assembly in accordance with one embodiment as compared to that which may be experienced in operating a conventional vehicle.

The foregoing description of embodiments and examples of the invention has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate the principles of the invention and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A motorcycle comprising a handlebar assembly, the handlebar assembly comprising:

a base attached to a fork and having a left attachment portion and a right attachment portion;

a left arm attached to the left attachment portion of the base and being selectively rotatable with respect to the base about a left arm axis;

a right arm attached to the right attachment portion of the base and being selectively rotatable with respect to the base about a right arm axis;

a left handle comprising an inner left end and an outer left end, the left handle being attached to the left arm adjacent to the inner left end and extending along a left handle axis from the inner left end and toward the outer left end, wherein the left handle is selectively rotatable with respect to the left arm about the left handle axis, and wherein the left handle axis is generally parallel with the left arm axis; and a right handle comprising an inner right end and an outer right end, the right handle being attached to the right arm adjacent to the inner right end and extending along a right handle axis from the inner right end and toward the outer right end, wherein the right handle is selectively rotatable with respect to the right arm about the right handle axis, and wherein the right handle axis is generally parallel with the right arm axis.

2. A vehicle comprising a handlebar assembly, the handlebar assembly comprising:

a base comprising a left attachment portion and a right attachment portion;

a left arm attached to the left attachment portion of the base and being selectively rotatable with respect to the base about a left arm axis;

a right arm attached to the right attachment portion of the base and being selectively rotatable with respect to the base about a right arm axis;

a left handle comprising an inner left end and an outer left end, the left handle being attached to the left arm adjacent to the inner left end and extending along a left handle axis from the inner left end and toward the outer left end, wherein the left handle is selectively rotatable with respect to the left arm about the left handle axis, and wherein the left handle axis is generally parallel with the left arm axis; and a right handle comprising an inner right end and an outer right end, the right handle being attached to the right arm adjacent to the inner right end and extending along a right handle axis from the inner right end and toward the outer right end, wherein the right handle is selectively rotatable with respect to the right arm about the right handle axis, and wherein the right handle axis is generally parallel with the right arm axis.

3. The vehicle of claim 2 wherein the left arm extends from a lower left end to an upper left end, the right arm extends from a lower right end to an upper right end, the left arm is attached to the left attachment portion of the base adjacent to the lower left end, the right arm is attached to the right attachment portion of the base adjacent to the lower right end, the left arm is attached to the left handle adjacent to the upper left end, and the right arm is attached to the right handle adjacent to the upper right end.

4. The vehicle of claim 2 wherein:
the left arm defines a left attachment aperture and a left handle aperture;
the left attachment portion is received in splined engagement within the left attachment aperture;
the right arm defines a right attachment aperture and a right handle aperture;
the right attachment portion is received in splined engagement within the right attachment aperture;
a portion of the left handle is received in splined engagement within the left handle aperture; and
a portion of the right handle is received in splined engagement within the right handle aperture.

5. The vehicle of claim 4 wherein:
the left arm axis extends into a center of the left attachment aperture;
the right arm axis extends into a center of the right attachment aperture;
the left handle axis extends into a center of the left handle aperture; and
the right handle axis extends into a center of the right handle aperture.

6. The vehicle of claim 4 further comprising a frame, a fork, and a front wheel, wherein:
the front wheel is rotatably attached to the fork such that the front wheel is rotatable with respect to the fork about a wheel axis;
the base is attached to the fork; and
the base is rotatably attached to the frame.

7. The vehicle of claim 6 wherein each of the left arm axis, the right arm axis, the left handle axis, and the right handle axis is generally parallel with the wheel axis.

8. The vehicle of claim 4 wherein:
the left arm comprises a left unitary structure that defines both of the left attachment aperture and the left handle aperture; and
the right arm comprises a right unitary structure that defines both of the right attachment aperture and the right handle aperture.

9. The vehicle of claim 8 wherein:
the left attachment aperture is spaced from, and extends generally parallel with, the left handle aperture; and
the right attachment aperture is spaced from, and extends generally parallel with, the right handle aperture.

10. The vehicle of claim 4 wherein:
the left attachment aperture is spaced from, and extends generally parallel with, the left handle aperture; and
the right attachment aperture is spaced from, and extends generally parallel with, the right handle aperture.

11. A handlebar assembly for a vehicle, the handlebar assembly comprising:
a base having a left attachment portion and a right attachment portion, wherein the base is configured for rotatable attachment to a frame of a vehicle;
a left arm attached to the left attachment portion of the base and being selectively rotatable with respect to the base about a left arm axis;
a right arm attached to the right attachment portion of the base and being selectively rotatable with respect to the base about a right arm axis;
a left handle comprising an inner left end and an outer left end, the left handle being attached to the left arm adjacent to the inner left end and extending along a left handle axis from the inner left end and toward the outer left end, wherein the left handle is selectively rotatable with respect to the left arm about the left handle axis, and wherein the left handle axis is generally parallel with the left arm axis; and
a right handle comprising an inner right end and an outer right end, the right handle being attached to the right arm adjacent to the inner right end and extending along a right handle axis from the inner right end and toward the outer right end, wherein the right handle is selectively rotatable with respect to the right arm about the right handle axis, and wherein the right handle axis is generally parallel with the right arm axis.

12. The handlebar assembly of claim 11 wherein the left arm extends from a lower left end to an upper left end, the right arm extends from a lower right end to an upper right end, the left arm is attached to the left attachment portion of the base adjacent to the lower left end, the right arm is attached to the right attachment portion of the base adjacent to the lower right end, the left arm is attached to the left handle adjacent to the upper left end, and the right arm is attached to the right handle adjacent to the upper right end.

13. The handlebar assembly of claim 11 wherein:
the left arm defines a left attachment aperture and a left handle aperture;
the left attachment portion is received in splined engagement within the left attachment aperture;
the right arm defines a right attachment aperture and a right handle aperture;
the right attachment portion is received in splined engagement within the right attachment aperture;
a portion of the left handle is received in splined engagement within the left handle aperture; and
a portion of the right handle is received in splined engagement within the right handle aperture.

14. The handlebar assembly of claim 13 wherein:
the left arm axis extends into a center of the left attachment aperture;
the right arm axis extends into a center of the right attachment aperture;
the left handle axis extends into a center of the left handle aperture; and
the right handle axis extends into a center of the right handle aperture.

15. The handlebar assembly of claim 13 wherein:
the left arm comprises a left unitary structure that defines both of the left attachment aperture and the left handle aperture; and
the right arm comprises a right unitary structure that defines both of the right attachment aperture and the right handle aperture.

16. The handlebar assembly of claim 15 wherein:
the left attachment aperture is spaced from, and extends generally parallel with, the left handle aperture; and
the right attachment aperture is spaced from, and extends generally parallel with, the right handle aperture.

17. The handlebar assembly of claim 13 wherein:
the left attachment aperture is spaced from, and extends generally parallel with, the left handle aperture; and
the right attachment aperture is spaced from, and extends generally parallel with, the right handle aperture.

* * * * *

UNITED STATES PATENT AND TRADEMARK OFFICE
CERTIFICATE OF CORRECTION

PATENT NO.        : 8,061,235 B2
APPLICATION NO.   : 12/254865
DATED             : November 22, 2011
INVENTOR(S)       : Daisuke Nagao et al.

It is certified that error appears in the above-identified patent and that said Letters Patent is hereby corrected as shown below:

Column 1, line 9, change "night" to -- right --; and

Claim 11, column 8, lines 21-22, change "adiacent" to -- adjacent --.

Signed and Sealed this
Twenty-eighth Day of February, 2012

David J. Kappos
*Director of the United States Patent and Trademark Office*